United States Patent [19]

Puckowski et al.

[11] 3,856,980
[45] Dec. 24, 1974

[54] TELECOMMUNICATION CABLES
[75] Inventors: Robert Tadeusz Puckowski; John Michael Richards Hagger; Keith Robert McMillan Elder, all of London, England
[73] Assignee: British Insulated Callender's Cables Limited, London, England
[22] Filed: Nov. 27, 1970
[21] Appl. No.: 92,992

[30] Foreign Application Priority Data
Nov. 28, 1969 Great Britain............... 58358/69

[52] U.S. Cl.............. 174/23 C, 174/23 R, 174/24, 156/47
[51] Int. Cl. ............................................ H01b 7/02
[58] Field of Search ......... 174/23 R, 23 C, 110 PM, 174/25 C, 17 LF; 252/63.7, 66, 63.5; 156/47, 49

[56] References Cited
UNITED STATES PATENTS
3,607,487  9/1971  Biskeborn et al..................... 156/47

FOREIGN PATENTS OR APPLICATIONS
757,395  9/1956  Great Britain.................. 174/25 C
1,095,639  12/1967  Great Britain....................... 174/23

Primary Examiner—Darrell L. Clay
Attorney, Agent, or Firm—Webb, Burden, Robinson & Webb

[57] ABSTRACT

The interstices of a telecommunication cable comprising a multiplicity of conductors each in part insulated with plastics material are filled with a water impermeable medium which comprises, as an essential ingredient, at least one synthetic polymeric material synthesised from petroleum products and, as another ingredient, at least one hydrocarbon wax and/or oil and which incorporates an anti-oxidant or a mixture of at least two anti-oxidants. The plastics insulation of the conductors is preferably of cellular form.

10 Claims, 2 Drawing Figures

PATENTED DEC 24 1974  3,856,980

Inventors:
Robert Tadeusz Puckowski,
John Michael Richards Hagger &
Keith Robert    By: McMillan Elder
Webb, Burden, Robinson & Webb Attorneys

TELECOMMUNICATION CABLES

This invention relates to telecommunication cables of the kind comprising a multiplicity of plastics insulated conductors enclosed within a water-proof sheath.

With the object of limiting the extent to which water that has entered a telecommunication cable through a defect in the cable sheath or in a joint in the cable may travel along the cable it has been proposed to fill the interstices between cellular plastics insulated conductors and between the conductors and the cable sheath from end to end of the cable length with a water-impermeable medium which will not drain under the influence of gravity or such hydrostatic pressure as may arise in the event of damage to the cable sheath but which will permit relative sliding movement of the cellular plastics insulated conductors over one another during such bending of the cable as occurs during manufacture and insulation of the cable. Telecommunication cables of this proposed form and other telecommunication cables whose interstices are so filled, for example those having solid plastics insulated conductors, are generally now known as, and will hereinafter be referred to as, "fully-filled" cables.

We have found that in some circumstances over a period of time there is a possibility that some of the anti-oxidant usually incorporated in the insulating material of the conductors of a fully filled cable may permeate into the water-impermeable filling medium with the result that when the insulated conductors are exposed to the atmosphere there is a tendency for the exposed conductor insulation to deteriorate due to oxidation changes resulting in an adverse effect on the electrical characteristics of the cable and leading to mechanical breakdown of insulation and, in the course of time, even breakdown of the cable. Loss of anti-oxidant from the insulating material of the conductors into the water-impermeable filling medium of fully-filled cables may result in a tendency for deterioration of the conductor insulation especially at cable installations, for instance cable terminations and joints, and especially those installations which are enclosed in boxes or cabinets situated above ground and exposed to sunlight and which, as a result, may be subjected to high temperatures for long periods. Deterioration of conductor insulation due to oxidation changes caused by loss of anti-oxidant is especially likely in the case of fully-filled cables having copper conductors. An example of a fully-filled cable whose conductor insulation is especially prone to deterioration due to loss of anti-oxidant from the insulating material is a so-called "pilot and telephone" cable which is usually laid alongside the power cable or cables of the circuit or circuits with which the pilot cores are associated and which, when in service, may be subjected to temperatures as high as 70°C.

It is an object of the present invention to provide a fully-filled telecommunication cable having conductors at least in part insulated with plastics material in which any tendency for the plastics insulation of the conductors to deteriorate due to oxidation is greatly reduced or substantially eliminated.

In accordance with the invention we achieve this object by filling the interstices between the insulated conductors and between the conductors and the water-proof sheath or, in the case of a unit type cable between the conductors of each group and between the conductors and a water-impermeable covering surrounding the group of conductors, with a water-impermeable medium, of the kind used in a fully-filled cable, which medium comprises, as an essential ingredient, a synthetic polymeric material synthesised from petroleum products or a mixture of two or more of such polymeric materials and, as another ingredient, at least one hydrocarbon wax and/or oil and in which medium is incorporated an anti-oxidant or a mixture of two or more anti-oxidants.

We have found that whilst a cable is in service the anti-oxidant or mixture of anti-oxidants in the filling medium tends to permeate into the plastics insulation of the conductors thereby substantially compensating for loss of anti-oxidant from the conductor insulation into the filling medium. Also, where a water-proof sheath of the cable is in contact with the filling medium and is also of a plastics material containing an anti-oxidant, the anti-oxidant or mixture of anti-oxidants in the filling medium will also permeate into, and compensate for loss of anti-oxidant from, the sheath into the filling medium.

Filling media suitable for use in fully-filled cables in accordance with the present invention whose conductors are insulated with solid or cellular polyethylene, polyethylene copolymer, polypropylene or polypropylene copolymer include:

a. mixtures of one or more of the following polymers: polyethylene, polybutene, polyisobutylene or amorphous polypropylene, with hydrocarbon oil and/or wax;

b. mixtures of one or more of the following polymers: polyethylene, polybutene, polyisobutylene or amorphous polypropylene with petroleum jelly, and c. mixtures of polyisobutylene, aluminium stearate, hydrocarbon oil and wax.

Of these filling media the medium comprising a mixture of polybutene and hydrocarbon wax with or without some hydrocarbon oil is preferred because, in addition to having the necessary properties of compatibility with the particular insulating material used to insulate the individual conductors and with the material of the sheath, of high coefficient of bulk resistivity, a high dielectric strength and a low permittivity, it is not unpleasant to handle when manufacturing or jointing a cable.

We prefer to use as the anti-oxidant 2:6 ditertiary butyl-4-methylphenol because this material is readily available and is relatively cheap, being sold by I.C.I. Limited under the trade name "Topanol O" and by Shell under the trade name "Ionol". Other anti-oxidants or mixtures of anti-oxidants that may be incorporated in any of the filling media to which reference has been made include:

2:2'-methylenebis-(6-$\alpha$-methylcyclohexyl-4-methylphenol) sold by I.C.I. Limited under the trade name "Nonox WSP";

4:4'-thiobis-(6-tertiary butyl-3-methylphenol) sold by Monsanto Chemical Co. Ltd. under the trade name "Santonox R";

A mixture of tris-(2-methyl-4-hydroxy-5-tertiary butylphenyl) butane sold by I.C.I. Limited under the trade name "Topanol CA" and dilauryl-$\beta\beta'$-thiodipropionate in the ratio from 1:1 to 1:3 by weight.

The proportion of anti-oxidant incorporated in the filling medium will depend upon the type of cable, the plastics material of the conductor insulation, the filling medium and anti-oxidant or anti-oxidants employed, and the service conditions to which the cable is likely to be subjected. Generally the proportion of anti-oxidant or mixture of anti-oxidants will not exceed 0.5 percent by weight and where the conductor insulation is polyethylene, will preferably lie within the range 0.1 to 0.2 percent by weight.

An anti-oxidant or a mixture of anti-oxidants may be incorporated in a flame-resistant water impermeable medium used to fill the interstices of a telecommunication cable without any adverse effect on the flame-resistant properties of the medium.

Two examples of telecommunication cable in accordance with the invention will now be described with reference to the accompanying drawing, in which.

Figure 1:
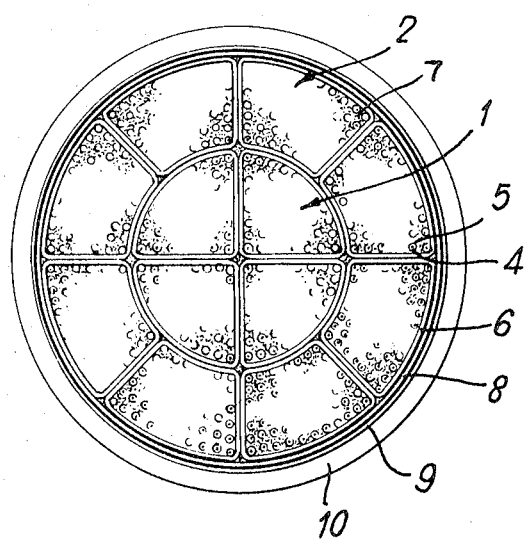
FIG. 1 is a cross-sectional view of a telephone distribution cable.

The telephone distribution cable shown in FIG. 1 is of the unit type and comprises twelve cable units, four of which units 1 are of substantially sector-shaped cross-section and are laid up together to form a core and the remaining eight of which units 2 are of substantially segmental cross-section and are laid up about the core of sector-shaped units 1. Each cable unit 1, 2 comprises a multiplicity of conductors 4 of hard drawn aluminium, each having a dielectric 5 of cellular polyethylene. The insulated conductors of each unit 1, 2 are surrounded by a layer 6 of tape of extensible Kraft paper, the tape having been applied longitudinally to the assembled conductors and folded transversely around them with an overlap. The layer 6 of paper tape is retained in place by an outer tape (not shown) of orientated polypropylene applied helically about the cable unit. The interstices between the insulated conductors of the cable unit 1, 2 and between the conductors and the layer 6 of paper tape from end to end of the unit are filled with a water impermeable medium 7 which comprises:

| polyethylene | 17% by weight |
| petroleum jelly | 82.8% by weight |
| "Topanol O" | 0.2% by weight | and which has a drop point (I.P.-31 Method) of 70°C. The water impermeable medium 7 impregnates the layer 6 of paper tape so that it constitutes a barrier to the ingress of moisture.

An overall layer 8 of paper tape surrounds the assembled units 1, 2 and the taped units are enclosed by a screen 9 formed from a polyethylene/aluminium laminated tape applied longitudinally with the polyethylene layer outermost and with an overlap. An extruded polyethylene sheath 10 is bonded to the outer polyethylene layer of the screen 9 and encloses the screened assembly of units. Water-impermeable filling medium 7 also fills the interstices between the units 1, 2 and between the units and the overall layer 8 of paper tape which is also impregnated with the filling medium to constitute a barrier to the ingress of moisture.

Figure 2:
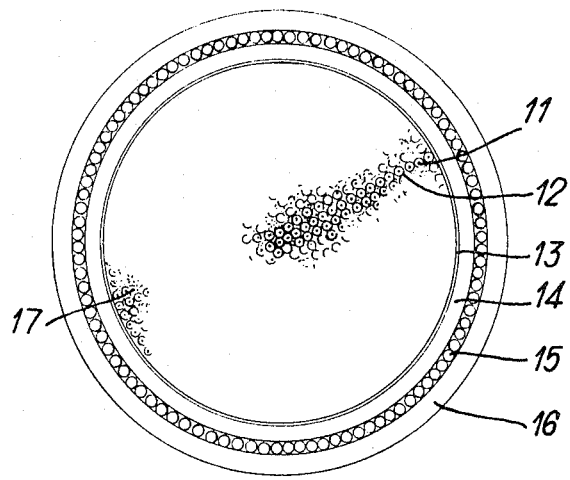
FIG. 2 is a cross-sectional view of a pilot and telephone cable.

The pilot and telephone cable shown in FIG. 2 comprises a multiplicity of copper conductors 11 each having an extruded dielectric 12 of solid polyethylene. The laid-up insulated conductors are surrounded by a helically applied separating layer 13 comprising a triple laminate of polyethylene/Melinex S/polyethylene tape to which is bonded a continuous seamless, tightly fitting sheath 14 of polyethylene. A single layer 15 of galvanised steel wires is laid helically around the polyethylene sheath 14 and is protected by an extruded oversheath 16 of black polyvinyl chloride. The interstices between the insulated conductors and between the conductors and the polyethylene sheath 14 throughout the length of the cable are filled with a water impermeable medium 17 comprising:

| polybutene | 74.8% by weight |
| hydrocarbon wax | 25% by weight |
| "Nonox WSP" | 0.2% by weight |

The water impermeable medium has a drop point (I.P.-31 Method) of 80°C. The separating layer 13 between the insulated conductors and the polyethylene sheath 14 substantially eliminates the risk of migration of filling medium through the polyethylene sheath.

What we claim as our invention is:

1. As an article of manufacture, a telecommunication cable comprising a multiplicity of conductors each at least in part insulated with plastics material having an anti-oxidant therein and a water-proof sheath, the interstices between the insulated conductors and between the conductors and the water-proof sheath being filled with a water-impermeable medium which will not drain under the influence of gravity or such hydrostatic pressure as may arise in the event of damage to the cable sheath but which will permit relative sliding movement of the insulated conductors over one another during such bending of the cable as occurs during manufacture and installation of the cable and which comprises, as an essential ingredient, at least one synthetic polymeric material synthesised from petroleum products and, as another ingredient, at least one of a hydrocarbon wax, a hydrocarbon oil and a mixture of a hydrocarbon wax and oil, wherein sufficient of at least one anti-oxidant is incorporated in the water-impermeable medium that, while the cable is in service and anti-oxidant from the plastics insulation of the conductors is tending to permeate into the water-impermeable medium, the anti-oxidant incorporated in said water-impermeable medium will tend to permeate into the plastics insulation of the conductors thereby substantially to compensate for loss of anti-oxidant from the conductor insulation into the water-impermeable medium.

2. A telecommunication cable as claimed in claim 1, wherein the cable is of the unit type and the interstices between the insulated conductors of each group of conductors and between the conductors and a water-impermeable covering therefor are filled with the water-impermeable medium containing anti-oxidant.

3. A telecommunication cable as claimed in claim 1, wherein the proportion of anti-oxidant in the filling medium does not exceed 0.5 percent by weight of filling medium.

4. A telecommunication cable as claimed in claim 1, in which the conductor insulation is of polyethylene, wherein the proportion of anti-oxidant in the filling medium lies within the range of 0.1 to 0.2 percent by weight of filling medium.

5. A telecommunication cable as claimed in claim 1, wherein the anti-oxidant is 2:6 - ditertiary butyl-4-methylphenol.

6. A telecommunication cable as claimed in claim 1, wherein the anti-oxidant is 2:2' - methylenebis - (6 -α -methylcyclohexyl - 4 - methylphenol).

7. A telecommunication cable as claimed in claim 1, wherein the anti-oxidant is 4:4' - thiobis - (6 - tertiary butyl - 3 - methylphenol).

8. A telecommunication cable as claimed in claim 1, wherein the anti-oxidant comprise a mixture of tris - (2 - methyl - 4 - hydroxy - 5 - tertiary butylphenyl) butane and dilauryl - $\beta\beta^1$ - thiodipropionate in the ratio from 1:1 to 1:3 by weight is incorporated in the water-impermeable medium.

9. As an article of manufacture, a telecommunication cable comprising a multiplicity of conductors each having a dielectric of plastics material of cellular form having an anti-oxidant therein and a water-proof sheath, the interstices between the insulated conductors and between the conductors and the water-proof sheath being filled with a water-impermeable medium which will not drain under the influence of gravity or such hydrostatic pressure as may arise in the event of damage to the cable sheath but which will permit relative sliding movement of the cellular plastics insulated conductors over one another during such bending of the cable as occurs during manufacture and installation of the cable and which comprises, as an essential ingredient, at least one synthetic polymeric material synthesised from petroleum products and, as another ingredient, at least one of a hydrocarbon wax, a hydrocarbon oil and a mixture of a hydrocarbon wax and oil, wherein sufficient of at least one anti-oxidant is incorporated in the water-impermeable medium that, while the cable is in service and anti-oxidant from the cellular plastics insulation of the conductors is tending to permeate into the water-impermeable medium, the anti-oxidant incorporated in said water-impermeable medium will tend to permeate into the cellular plastics dielectric of the conductors thereby substantially to compensate for loss of anti-oxidant from the conductor insulation into the water-impermeable medium.

10. As an article of manufacture, a telecommunication cable comprising a multiplicity of conductors each at least in part insulated with plastics material having an anti-oxidant therein and a water-proof sheath, the interstices between the insulated conductors and between the conductors and the water-proof sheath being filled with a water-impermeable medium which will not drain under the influence of gravity of such hydrostatic pressure as may arise in the event of damage to the cable sheath but which will permit relative sliding movement of the insulated conductors over one another during such bending of the cable as occurs during manufacture and installation of the cable and which comprises, as an essential ingredient, at least one synthetic polymeric material synthesised from petroleum products and, as another ingredient, petroleum jelly, wherein sufficient of at least one anti-oxidant is incorporated in the water-impermeable medium that, while the cable is in service and anti-oxidant from the plastics insulation of the conductors is tending to permeate into the water-impermeable medium, the anti-oxidant incorporated in said water-impermeable medium will tend to permeate into the plastics insulation of the conductors thereby substantially to compensate for loss of anti-oxidant from the conductor insulation into the water-impermeable medium.

\* \* \* \* \*